US011205909B2

United States Patent
Cordes et al.

(10) Patent No.: US 11,205,909 B2
(45) Date of Patent: Dec. 21, 2021

(54) METHOD AND SYSTEM FOR CHARGE CRADLE LOCK CONTROL

(71) Applicant: ZEBRA TECHNOLOGIES CORPORATION, Lincolnshire, IL (US)

(72) Inventors: Kevin Cordes, Miller Place, NY (US); David Tietjen Lundquist, Stony Brook, NY (US); Rohan Chopra, Port Jefferson Station, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 223 days.

(21) Appl. No.: 16/392,361

(22) Filed: Apr. 23, 2019

(65) Prior Publication Data
US 2020/0343747 A1    Oct. 29, 2020

(51) Int. Cl.
*H02J 7/00*    (2006.01)
*H04M 1/04*    (2006.01)
*H04M 1/02*    (2006.01)

(52) U.S. Cl.
CPC .......... *H02J 7/0045* (2013.01); *H02J 7/0044* (2013.01); *H04M 1/026* (2013.01); *H04M 1/04* (2013.01)

(58) Field of Classification Search
CPC ............................. H02J 7/0045; H02J 7/0044
USPC ........................................................ 320/107
See application file for complete search history.

(56) References Cited

U.S. PATENT DOCUMENTS

| | | | |
|---|---|---|---|
| 2006/0294586 A1* | 12/2006 | Upton | G06F 21/34 726/17 |
| 2009/0158423 A1* | 6/2009 | Orlassino | G06F 21/32 726/19 |
| 2015/0185709 A1* | 7/2015 | Vroom | G06F 21/31 318/476 |
| 2015/0270874 A1* | 9/2015 | Kiszka | H04L 9/00 455/557 |
| 2016/0154431 A1* | 6/2016 | Vroom | G05B 9/02 361/679.41 |
| 2016/0299479 A1* | 10/2016 | Hegewald | G05B 15/02 |
| 2017/0144613 A1* | 5/2017 | Catlin | H04B 1/3877 |
| 2020/0095804 A1* | 3/2020 | Pavlovic | E05B 47/02 |

* cited by examiner

*Primary Examiner* — Suchin Parihar

(57) ABSTRACT

A mobile computing device includes: a housing having a recess configured to receive a latch of a charging cradle to lock the mobile computing device in the charging cradle; a set of charging contacts configured to engage with corresponding power connectors of the charging cradle; and a processor configured to: responsive to detecting an unlock event, determine whether an unlock condition is satisfied; and when the unlock condition is satisfied, cause the charging cradle to release the latch.

25 Claims, 6 Drawing Sheets

METHOD AND SYSTEM FOR CHARGE CRADLE LOCK CONTROL

BACKGROUND

Mobile computing devices may be powered by rechargeable batteries. Deployments of such mobile devices may also be accompanied by charging cradles, into which one or more mobile computing devices may be placed to recharge the above batteries. In some deployments, the cradles are placed in unsecured or high-traffic areas. To reduce the risk of loss or theft of the devices, the cradles may therefore be equipped to lock the devices into the cradles, in order to prevent unauthorized removal. Providing cradles with locking functions, however, may require dedicated communications hardware, which increases the cost and complexity of the system.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
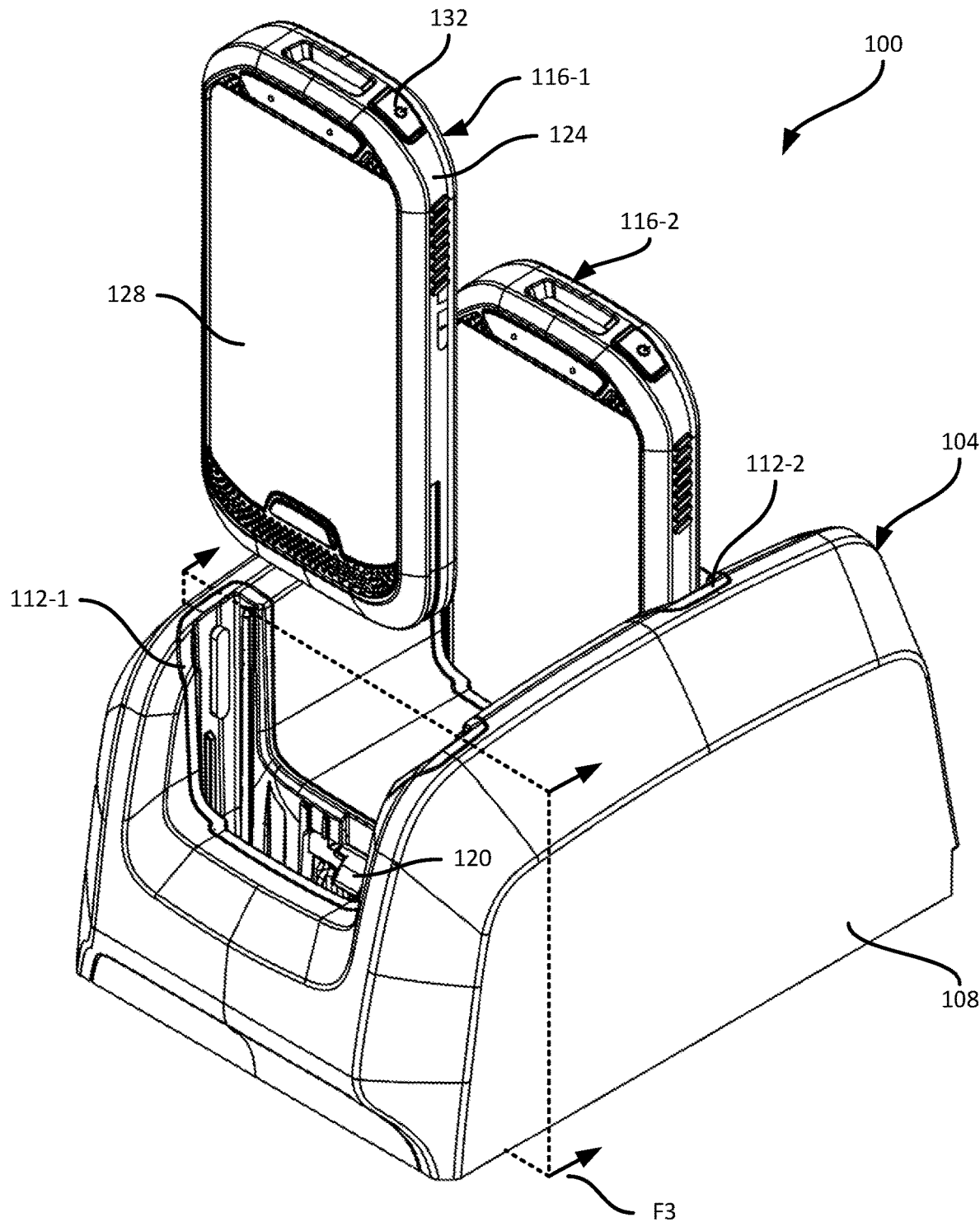
FIG. 1 is an isometric view of a device charging system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a mobile computing device including: a housing having a recess configured to receive a latch of a charging cradle to lock the mobile computing device in the charging cradle; a set of charging contacts configured to engage with corresponding power connectors of the charging cradle; and a processor configured to: responsive to detecting an unlock event, determine whether an unlock condition is satisfied; and when the unlock condition is satisfied, cause the charging cradle to release the latch.

Additional examples disclosed herein are directed to a method in a mobile computing device, including: receiving electrical power from a charging cradle via a set of charging contacts configured to engage with corresponding power connectors of the charging cradle, wherein the charging cradle includes a latch received in a recess of a housing of the mobile computing device to lock the mobile computing device in the charging cradle; responsive to detecting an unlock event, determining whether an unlock condition is satisfied; and when the unlock condition is satisfied, causing the charging cradle to release the latch.

Further examples disclosed herein are directed to a charging cradle for a mobile computing device, the charging cradle comprising: a cradle body defining a slot to receive the mobile computing device; a set of power connectors in the slot configured to engage with corresponding charging contacts on a housing of the mobile computing device; a latch movable between (i) an extended position to engage with the housing and lock the mobile computing device into the slot, and (ii) a retracted position to disengage from the housing to unlock the mobile computing device for removal from the slot; a current sensor coupled to the power connectors; and a controller connected to the current sensor and the latch, wherein the controller is configured to: receive a measured current profile from the current sensor; extract command data from the measured current profile; and responsive to extracting the command data, move the latch from the extended position to the retracted position to unlock the mobile computing device.

Further examples disclosed herein are directed to a method in a mobile computing device, comprising: responsive to detecting an unlock event, determining whether an unlock condition is satisfied; when the unlock condition is satisfied, disconnecting a power supply subsystem connected to a battery of the mobile computing device from a set of charging contacts of the mobile computing device; and toggling a signaling switch according to a command sequence to generate a current profile across the charging contacts, to cause a charging cradle to release a latch engaged with a housing recess of the mobile computing device responsive to detection of the current profile at power connectors engaged with the charging contacts.

FIG. 1 depicts a system 100 for controlling locking functionality of a charging cradle. In particular, FIG. 1 illustrates a charging cradle 104 (also referred to herein simply as the cradle 104). The charging cradle 104 includes a body 108 defining one or more slots for receiving mobile computing devices therein. In the illustrated example, two slots 112-1, 112-2 are defined in the body 108, for receiving mobile computing devices 116-1 and 116-2, respectively. In the illustrated example, the slots 112 are defined by inserts mounted in the body 108, e.g. during manufacturing of the cradle 104. The slots 112 may also be integrally formed with the body 108, however. Although two slots 112 and corresponding devices 116 are shown in FIG. 1, in other examples the cradle 104 can include a single slot 112, or a number of slots 112 greater than two. As will be apparent to those skilled in the art, the discussion below sets out various features of the cradle, including features of the slot 112-1. In embodiments having more than one slot 112, such slot-specific features are reproduced for each slot 112.

When the device 116-1 is inserted into the slot 112-1, the cradle 104 supplies electrical power to the device 116-1 to charge a battery of the device 116-1. In addition, the cradle 104 locks the device 116-1 into the slot 112-1 via activation of a latch 120. As will be discussed below, the latch 120, when activated, extends into the slot 112 to engage a complementary structure of the device 116-1. The cradle 104 can also activate other devices, such as one or more lights (e.g. light-emitting diodes, LEDs) or other indicator outputs associated with each slot 112, under certain conditions. The inserts defining the slots 112 in the present example may be transparent to permit the emission light from LEDs contained within the body 108. The mechanism by which the cradle 104 determines when to activate the latch 120 and any other devices, such as the above-mentioned lights, will be discussed in detail herein.

Each device 116 includes a housing 124 supporting various other components of the device 116, including a display 128. Each device 116 also includes one or more input assemblies, such as a touch screen integrated with the display 128, one or more buttons 132 and the like.

Figure 2:
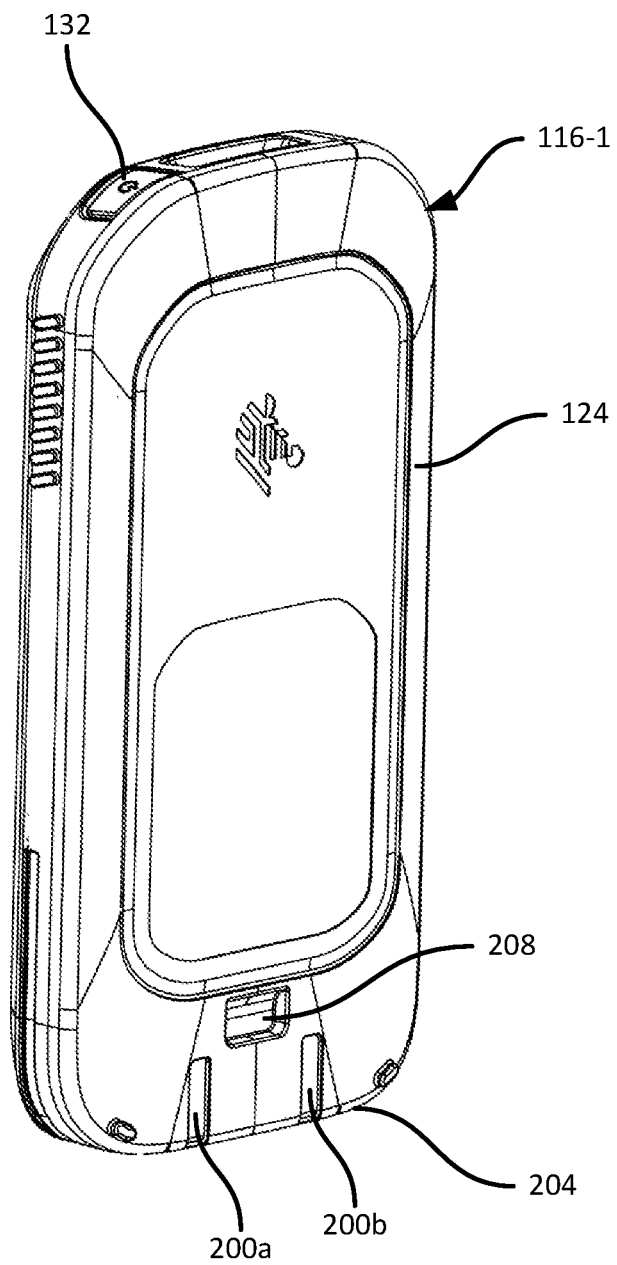
FIG. 2 is a rear isometric view of a device of FIG. 1.

Turning to FIG. 2, a rear view of the device 116-1 is illustrated. In addition to a rear portion of the housing 124 and the button 132, FIG. 2 illustrates a set (a pair, in the illustrated example) of charging contacts 200a and 200b, such as conductive plates, disposed on the housing 124. In the present example, the set of charging contacts 200 are disposed on the rear of the housing 124, at or adjacent to a lower end 204 of the device 116-1. As will be apparent from FIG. 1, the lower end 204 of the device 116-1 is the end that is inserted into the slot 112.

The housing 124 also defines a recess 208 therein to receive the latch 120 mentioned in connection with FIG. 1. As shown in FIG. 2, the recess 208 is shaped to receive an end of the latch 120, and to prevent removal of the device 116-1 from the slot 112-1 when the latch 120 is received in the recess 208. The recess 208 is adjacent to the contacts 200 in the present example, but in other examples the recess 208 may be defined in other suitable locations on the housing 124, depending on the arrangement of the latch 120 and other components in the cradle 104.

Figure 3:
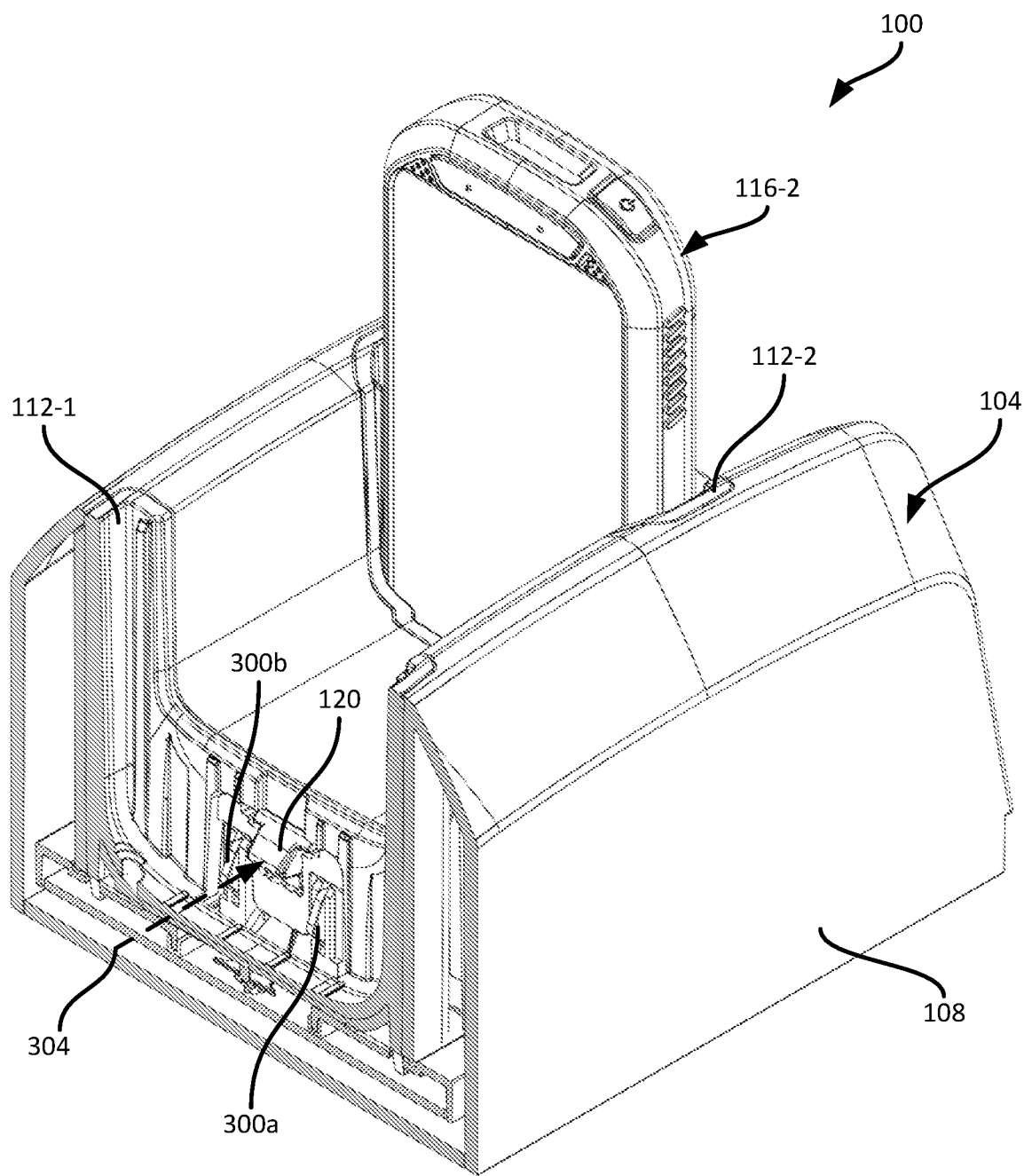
FIG. 3 is a cross-sectional view of the system of FIG. 1, taken at the section plane "F3".

Turning now to FIG. 3, a cross-sectional view of the system 100 is illustrated, omitting the device 116-1. The cross-sectional view of FIG. 3 is taken at the sectioning plane "F3" as shown in FIG. 1. In addition to the latch 120, FIG. 3 shows a set of power connectors 300a and 300b corresponding to the charging contacts 200a and 200b, respectively, of the device 116-1. The power connectors 300 may be, for example, spring-loaded conductive members that are biased into the slot 112-1 and into engagement with the charging contacts 200 when the device 116-1 is inserted in the slot 112-1. The latch 120 is controlled by a controller of the cradle 104, discussed below in greater detail, to transition between extended and retracted positions. In the extended position, as shown in FIGS. 1 and 3, the latch 120 protrudes into the slot 112-1 to engage with the recess 208 discussed above in connection with FIG. 2, and prevent removal of the device 116-1 from the cradle 104. To transition to the retracted position, the latch 120 moves in the direction 304 indicated in dashed lines to withdraw from the slot 112-1 into the body 108 of the cradle 104, thus disengaging from the recess 208 and enabling removal of the device 116-1 from the slot 112-1.

The device 116-1 itself determines whether the latch 120 is to be moved to unlock the device 116-1. Further, the device 116-1 instructs the cradle 104 to retract the latch 120 by sending one-way communications to the cradle 104 via the charging contacts 200 and the power connectors 300. That is, the devices 116 and the cradle 104 need not be provided with additional communications contacts (e.g. USB ports or the like) to implement the above functionality.

Figure 4:
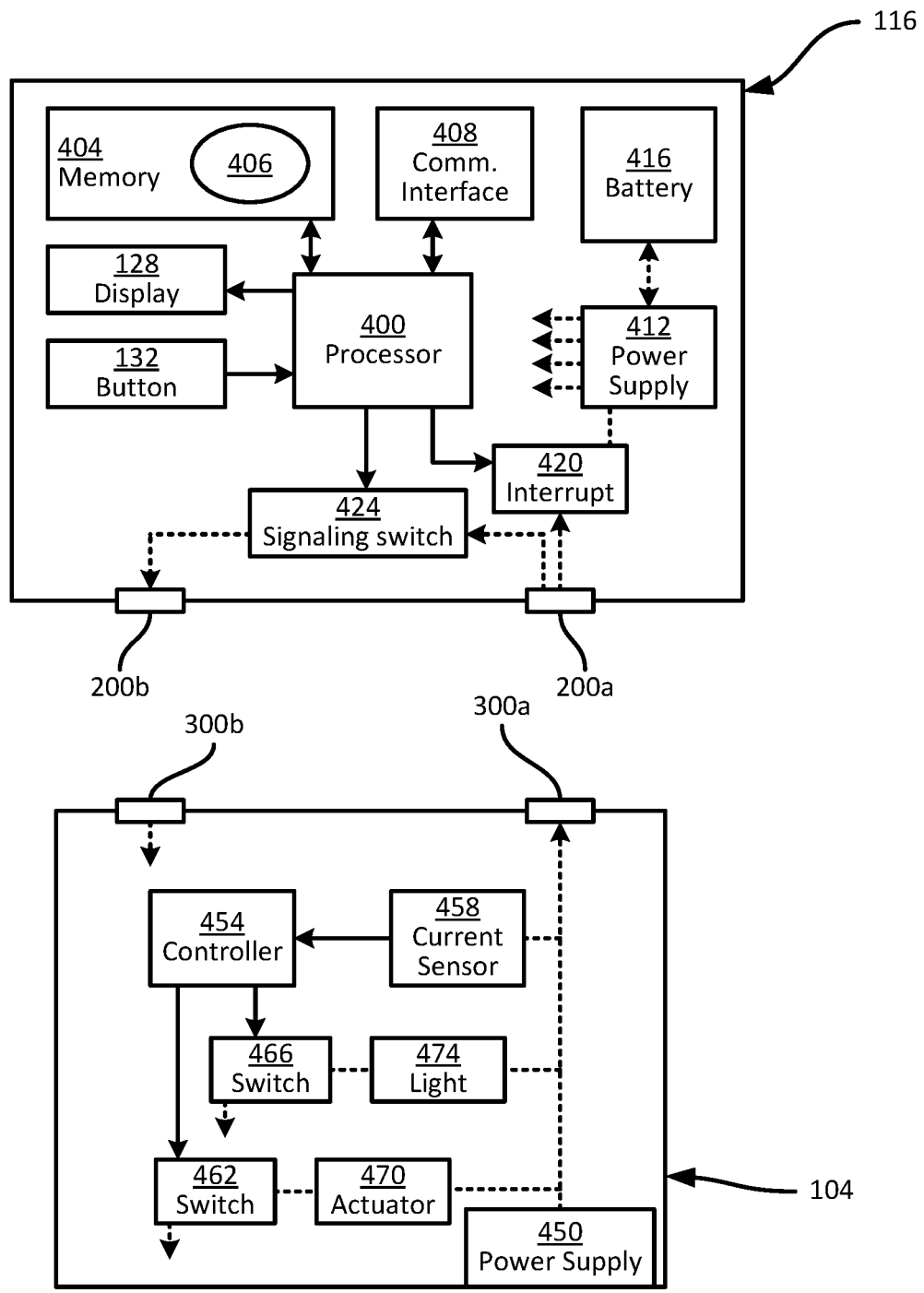
FIG. 4 is a block diagram of certain internal components of the device and the charging cradle of FIG. 1.

Before discussing the locking control mechanism implemented by the system 100, certain internal components of the devices 116 and the cradle 104 will be described with reference to FIG. 4. FIG. 4 illustrates certain internal components of a device 116 that represents both the devices 116-1 and 116-2. That is, each of the devices 116 shown in FIG. 1 (and indeed any other devices 116 employed with the cradle 104, when the cradle 104 has more than two slots 112) includes the components shown in FIG. 4.

As shown in FIG. 4, the device 116 includes a central processing unit (CPU), also referred to as a processor 400, interconnected with a non-transitory computer readable storage medium, such as a memory 404. The memory 404 includes any suitable combination of volatile memory (e.g. Random Access Memory ("RAM")) and non-volatile memory (e.g. read only memory ("ROM"), Electrically Erasable Programmable Read Only Memory ("EEPROM"), flash memory). In general, the processor 400 and the memory 404 each comprise one or more integrated circuits.

The memory 404 stores a plurality of applications, each including a plurality of computer readable instructions executable by the processor 400. The execution of the above-mentioned instructions by the processor 400 causes the device 116 to implement certain functionality, as discussed herein. The applications are therefore said to be configured to perform that functionality in the discussion below. In the present example, the memory 404 of the device 116 stores a cradle control application 406, also referred to herein as the application 406. The device 116 is configured, via execution of the application 406 by the processor 400, to generate and send command data to the cradle 104 via the charging contacts 200, for causing the cradle 104 to perform various actions (such as actuation of the latch 120).

In other examples, the processor 400, as configured by the execution of the application 406, is implemented as one or more specifically-configured hardware elements, such as field-programmable gate arrays (FPGAs) and/or application-specific integrated circuits (ASICs).

The device 116 also includes at least one input, such as the button 132 mentioned above, interconnected with the processor 400. As noted earlier, the device 116 can include various additional inputs, each configured to receive input (e.g. from an operator of the device 116) and provide data representative of the received input to the processor 400. The inputs, as noted earlier, can include any one of, or a suitable combination of, a touch screen, a keypad, a microphone, a fingerprint scanner, or the like.

The device 116 also includes the above-mentioned display 128 interconnected with the processor 400, and configured to render data under the control of the processor 400. The device 116 can also include one or more output devices in addition to the display 128, such as a speaker, a notification LED, and the like (not shown).

The device 116 also includes a communications interface 408 interconnected with the processor 400. The communications interface 408 includes any suitable hardware (e.g. transmitters, receivers, network interface controllers and the like) allowing the device 116 to communicate with other computing devices via wired and/or wireless links (e.g. over local or wide-area networks). The communications interface 408 can also include short-range communications hardware, such as a radio-frequency identification (RFID) assembly.

The components of the device 116 are supplied with electrical power by a power supply subsystem 412, which routes such electrical power from either a battery 416 within the housing 124 or the charging contacts 200 (when the device 116 is in the cradle 104). The power supply subsystem 412 also routes power from the charging contacts 200 to the battery 416 to charge the battery when the device 116 is in the cradle 104. Delivery of electrical power is illustrated in FIG. 4 as dashed lines, while communications (e.g. via internal buses or the like) between components is illustrated in solid lines. Power delivery from the power supply 412 to the other components (e.g. the processor 400) is not shown in full to maintain legibility of the drawing.

The device 116 also includes components employed for controlling the unlocking functionality of the cradle 104. In particular, the device 116 includes an interrupt switch 420 (e.g. implemented by a metal-oxide-semiconductor field-effect transistor (MOSFET)) between the charging contacts 200 and the power supply 412. The interrupt switch 420, when closed, permits power to be delivered from the contacts 200 to the power supply 412 (e.g. for charging the battery 416 and/or powering the internal components of the device 116). When the interrupt switch 420 is open, however, power delivery to the power supply 412 is interrupted and the internal components of the device 116 are powered exclusively by the battery 416, even if the device 116 is in the cradle 104. The interrupt switch 420 may be implemented as a plurality of switches in other examples, depending on the exact configuration of the power supply 412 and the charging contacts 200.

The device 116 further includes a signaling switch 424 connected between the charging contacts 200. The signaling switch 424 may be implemented, for example, as a MOSFET controllable by the processor 400. The connections between the charging contacts 200 and the signaling switch 424 may also include a resistor element, such that when the signaling switch 424 is closed (and the device 116 is in the cradle 104), a predetermined current flows from the charging contact 200*a* through the signaling switch 424 to the charging contact 200*b*. As will be discussed below, the processor 400 controls the activation of the signaling switch 424 to generate a current profile at the charging contacts 200 that the cradle 104 can detect and extract command data from.

The cradle 104 includes, in addition to the power connectors 300, a power supply 450, e.g. connected to an electrical grid via a wall outlet or the like, to supply electrical power to the power connectors 300. More specifically, in the present example the power connector 300*a* delivers power to the device 116, while the connector 300*b* is connected to a neutral or return line (e.g. via the power supply 450). The power supply 450 also supplies electrical power to the internal components of the cradle 104 discussed below.

The cradle 104 also includes a controller 454, such as an ASIC, FPGA, microcontroller or the like, that executes computer-readable instructions stored therein to extract command data from current profiles detected at the power connectors 300, and to execute various actions (e.g. actuating the latch 120) according the command data. The controller 454 receives the above-mentioned current profiles from a current sensor 458 connected to the power connectors 300. For example, the current sensor 458 can be implemented as a current sense amplifier with a pair of inputs connected to opposing ends of a resistor in series with the power connector 300*a*. The current sensor 458 (and/or an analog-to-digital converter associated with the current sensor 458) generates a signal representing the current draw at the power connector 300*a* and transmits the signal to the controller 454. A series of current draw measurements received at the controller 454 constitutes a current profile. The controller 454 processes the above-mentioned current profile and, based on such processing, controls one or both of a first control switch 462 and a second control switch 466. The control switches 462 and 466 may be implemented as MOSFETs or other suitable switching circuits.

The first control switch 462, when closed, permits power to be delivered to an actuator 470 coupled to the latch 120. The actuator 470 can be, for example, a solenoid with a resting (i.e. unpowered) state that places the latch 120 in the extended position, and a powered state that retracts the latch 120, to unlock the device 116. When the first control switch 462 is open, the actuator 470 is not powered, and the latch remains in (or returns to) the extended position.

The second control switch 466, when closed, permits power to be delivered to a light 474, such as an LED mounted on or within the body 108 of the cradle 104, thus illuminating the light 474. When the second control switch 466 is open, the light 474 is disabled.

Although single instances of the current sensor 458, switches 462 and 466, light 474 and actuator 470 are illustrated, it will be understood that additional instances of the above-mentioned components are provided in the cradle 104 for each additional slot 112. That is, a cradle 104 with four slots 112 (each with its own pair of power connectors 300) includes four sensors 458, four switches 462, four switches 466, four actuators 470 and four lights 474. Such a cradle 104 may include a single controller 454 connected to each of the above components, or can include a smaller number of controllers 454 each responsible for controlling a subset of the slots 112.

Figure 5:
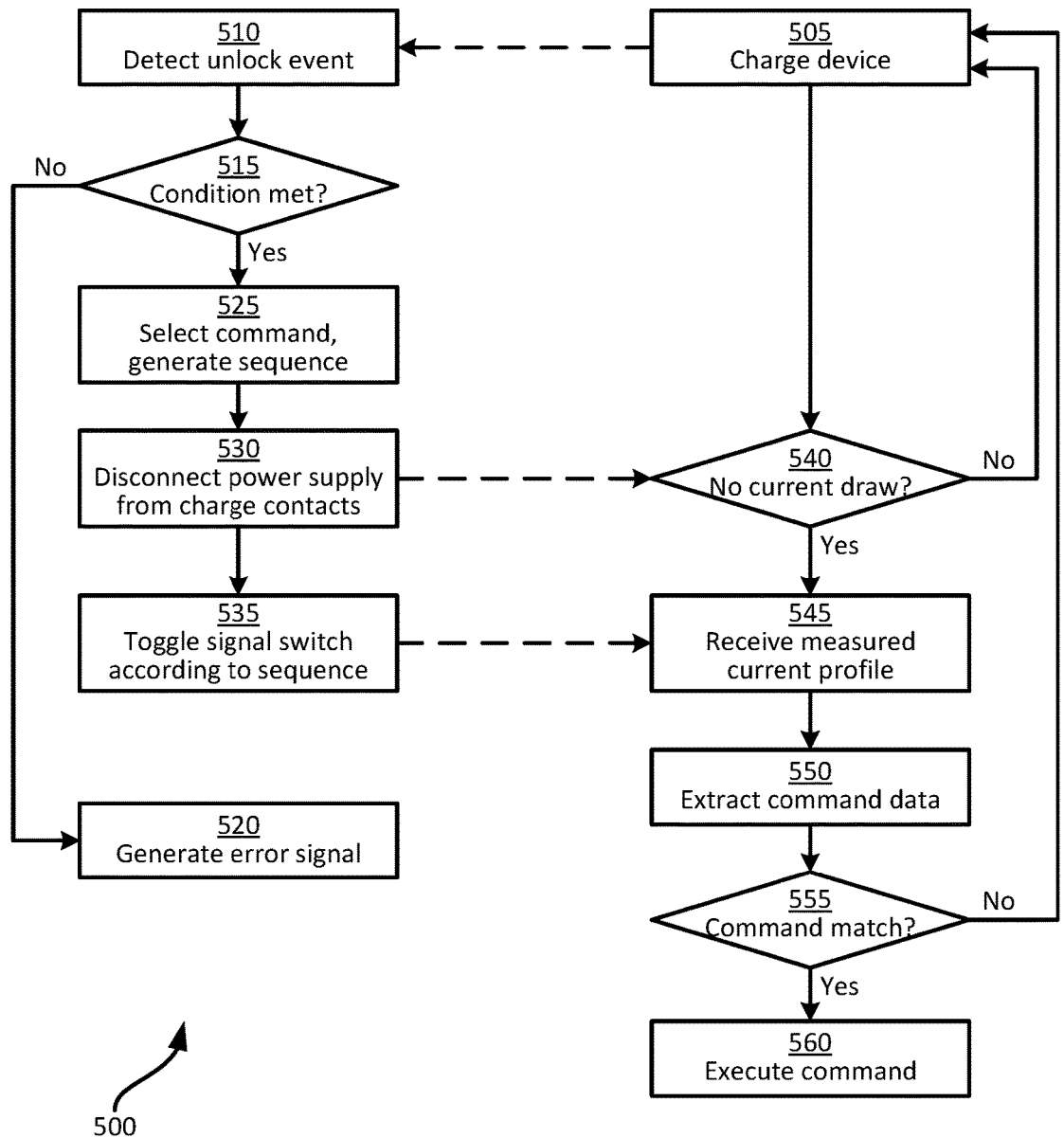
FIG. 5 is a flowchart of a method of charge cradle lock control.

The functionality implemented by the system 100 to control cradle operations such as unlocking the devices 116 will now be described in greater detail, with reference to FIG. 5. FIG. 5 illustrates a method 500 of charge cradle lock control, of which certain blocks are performed by the device 116, and other blocks are performed by the cradle 104.

It is assumed that the device 116 is placed into a slot 112 of the cradle 104 prior to the performance of the method 500. Thus, at block 505, the cradle 104 provides electrical power to the device 116 via the power connectors 300 and the charging contacts 200. It is further assumed that at block 505 the device 116 is locked into the cradle 104. That is, the latch 120 is in the extended position, and engages with the recess 208 to prevent removal of the device 116 from the slot 112.

At block 510, the device 116 detects an unlock event. The unlock event can take a wide variety of forms. For example, the unlock event can be a message received at the device 116 via the communications interface 408. The message can be received from another computing device, such as a kiosk, desktop computer that is configured to select a device 116 for deployment (e.g. one of a plurality of devices 116 in the cradle 104, or a set of cradles 104) responsive to an operator request. In other examples, the message is received at the device 116 when an operator brings a key fob, access card or other physical authentication token into proximity with the communications interface 408. In further examples, the message is received via activation of an input of the device 116, such as the button 132.

At block 515, the device 116 determines whether an unlock condition is satisfied. The unlock condition evaluated at block 515 can be, for example, whether a current charge level of the battery 416 exceeds a minimum threshold (e.g. 40% of maximum battery capacity). Other unlock conditions are also contemplated, such as whether the device is currently applying a software update (and is therefore not available for use). When the determination at block 515 is negative, the device 116 generates an error signal at block 520. The error signal can include a return message to the originator of the unlock event detected at block 510. For example, when the unlock event is a message received from another computing device, at block 520 the device 116 may transmit an error message to the other computing device. When the unlock event is received directly at the device via an authentication token as mentioned above, the device 116 can generate the signal at block 520 by controlling the display 128 to present an error message (e.g. a red screen and/or a text string stating that the device is not available for use).

When the determination at block 515 is affirmative (e.g. when the charge level of the battery 416 exceeds the above-mentioned threshold), the device 116 proceeds to block 525. At block 525, the device 116 selects an active command identifier according to the event from block 510, and generates a command sequence based on the selected command identifier. The device 116 may store, in the memory 404, a plurality of command identifiers, each corresponding to an action to be performed by the cradle 104 under the control of the device 116. The command selected at block 525 corresponds to the event detected at block 510. Therefore, in the present example an unlock command is selected at block 525 (corresponding to the unlock event detected at block 510).

Figure 6:
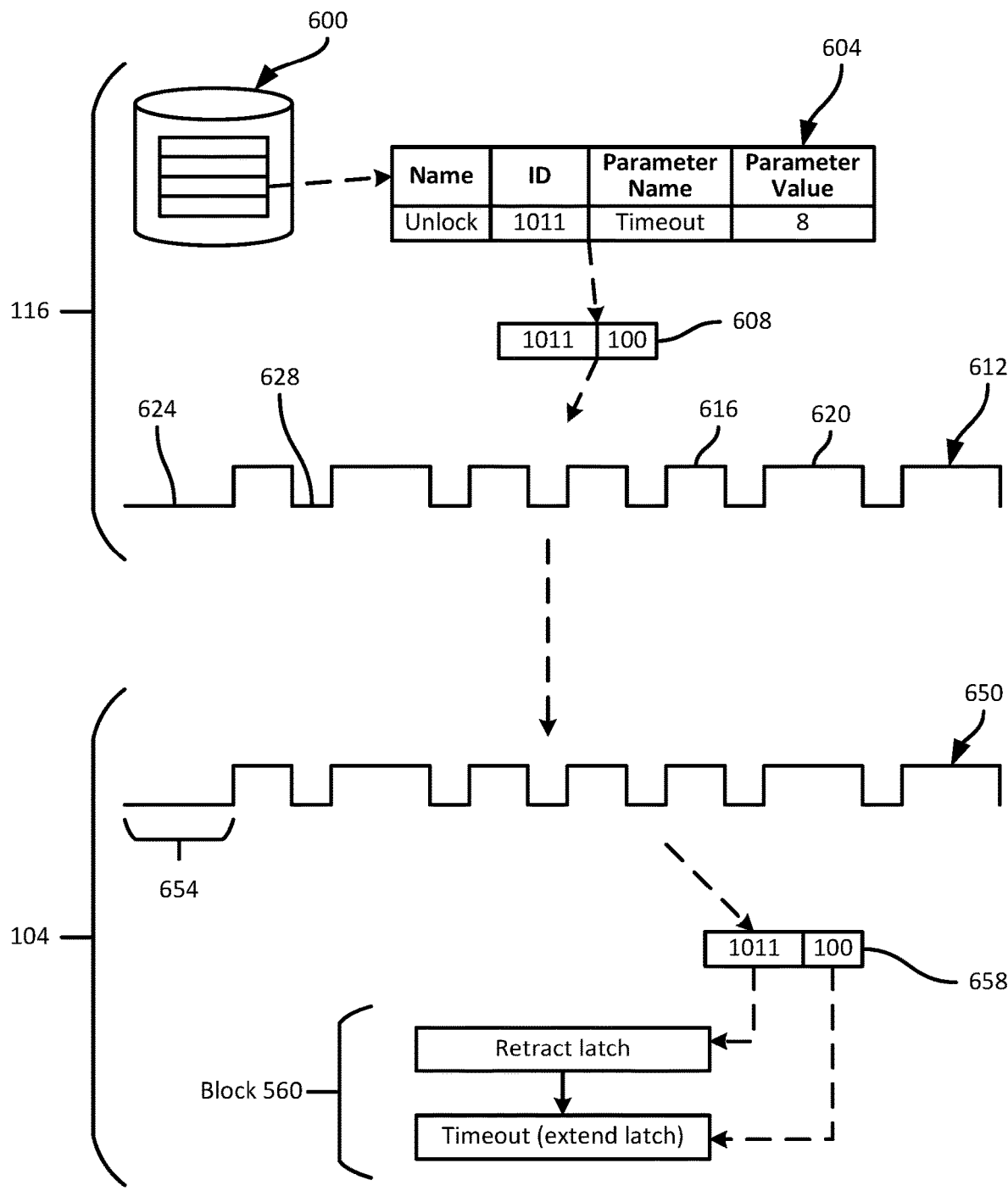
FIG. 6 is a schematic illustrating an example performance of the method of FIG. 5.

The sequence generated at block 525 will be employed, as discussed below, to toggle the signaling switch 424 to generate a current profile detectable by the cradle 104. The device 116 generates the sequence at block 525 by binary-encoding the selected command identifier, and optionally a command parameter. Turning to FIG. 6, a schematic diagram illustrates an example performance of the method 500, indicating actions performed at the device 116, and actions performed at the cradle 104.

As seen in FIG. 6, the device 116 maintains (e.g. the memory 404) a repository 600 containing a plurality of command identifiers. For example, the command identifiers can each be defined in respective records of the repository 600, an example record 604 of which is shown in FIG. 6. The record 604 defines an unlock command with the command identifier "1011". As will now be apparent, the command identifier is already binary-encoded, but in other examples a wide variety of other command identifiers can be stored in the repository 600, including identifiers that are not binary-encoded. The record 604 also includes, in the illustrated example, a command name "Unlock" and command parameter data. The command name and/or parameter data can be omitted in other embodiments.

The parameter data defines a name and value for a command parameter that modifies the command identifier. In the present example, the command parameter indicates a timeout period, e.g. in seconds, for which the unlock command will be applied at the cradle 104.

Having selected the unlock command identifier "1011" at block 525, the device 116 is configured to generate a sequence by binary-encoding the command identifier and the parameter value. Thus, the performance of block 525 results in a command sequence 608, including a four-bit value corresponding to the command identifier and a three-bit value corresponding to the command parameter. The sequence 608 can have a wide variety of other structures. For example, the sequence can include additional header data, error-correction bits, and the like. Further, the command identifier and the parameter value need not have the lengths shown in FIG. 6. For example, the command parameter can be encoded as a five-bit value, or any other suitable length.

Returning to FIG. 5, at block 530 the device 116 disconnects the power supply 412 from the charging contacts 200. More specifically, the processor 400 controls the interrupt switch 420 to disconnect the power supply 412 from the charging contacts 200. That is, the device 116 is powered solely by the battery 416 following block 525. When a predetermined length of time (e.g. 0.1 seconds, although a wide variety of other time periods may also be implemented) has elapsed after disconnecting the power supply 412, the device 116 proceeds to block 535.

At block 535, the device toggles the signaling switch 424 according to the command sequence generated at block 525, to generate a current profile across the charging contacts 200. Specifically, the processor 400 opens and closes the signaling switch 242 to generate a current profile including current pulses of a first length to indicate binary ones, and current pulses of a second length to indicate binary zeros.

Turning again to FIG. 6, a current profile 612 is illustrated, as generated via the performance of blocks 530 and 535. In particular, the current profile begins with a period 624 with no current draw, beginning when the interrupt switch 420 is opened at block 535, and ending when the first pulse is generated at block 535. The current profile includes pulses 616 for binary ones, and pulses 620 for binary zeros. As seen in FIG. 6, the length of the pulses 616 is smaller than the length of the pulses 620. In other examples the "one" pulses may instead be longer than the "zero" pulses. The relative lengths of the pulses 616 and 620 may also vary from that shown in FIG. 6. In addition, the current profile includes an inter-bit space 628 with a low or zero current between each pulse. The length of the inter-bit space 628 relative to the pulses 616 and 620 may also be varied from that shown in FIG. 6.

The device 116, in summary, opens and closes the signaling switch 424 to draw a specific current profile from the power connectors 300 of the cradle 104. The cradle 104, in turn, detects the current profile at the power connectors 300 and extracts command data therefrom. In particular, referring again to FIG. 5, at block 540 the cradle 104 determines whether the current draw at the power connectors 300 has dropped to zero (or below a predetermined threshold) for at least a predetermined time period (e.g. the above-mentioned period of 0.1 seconds). When the determination at block 540 is negative, the cradle 104 continues charging at block 505, and repeats the determination at block 540.

When the determination at block 540 is affirmative, e.g. when block 540 is performed simultaneously with the performance of block 530 by the device 116, the cradle 104 proceeds to block 545. At block 545, the controller 454 receives a measured current profile, e.g. by collecting a set of measurements from the current sensor 458 over a predetermined length of time corresponding to a preconfigured command sequence length (e.g. 0.25 seconds to 0.5 seconds). At block 550, the controller 454 extracts command data from the measured current profile. An illustration of the performance of blocks 540, 545 and 550 will be discussed in connection with FIG. 6.

Referring again to FIG. 6, a measured current profile 650 is illustrated as collected at the controller 454 from the current sensor 458. As will now be apparent, the measured current profile 650 is substantially identical to the current profile 612 discussed above, as the pulses of the current profile 612 at the device 116 are generated via power supplied by the power connectors 300.

The controller 454, responsive to detecting a low-current or no-current portion of the profile 650 having a length 654 that exceeds a predefined threshold, makes an affirmative determination at block 540. The controller 454 then collects the remainder of the profile 650 from the sensor 458 at block 545, and extracts command data from the profile 650 at block 550 by generating a binary string according to the lengths of the pulses in the profile 650. That is, in the present example the longer pulses are converted to binary zeros and the shorter pulses are converted to binary ones.

The controller 454 therefore, at block 550, generates extracted command data 658 from the current profile 650. The extracted command data 658 includes the binary string "1011100". Based on the predefined structure of the string, the controller 454 extracts the first four digits as a command identifier, and the following three digits as a command parameter.

Returning to FIG. 5, at block 555 the controller 454 determines whether the extracted command identifier matches a predefined command identifier. For example, the controller 454 can store a plurality of predefined command identifiers, including the identifier 1011 corresponding to an unlock command. When the determination at block 555 is negative, indicating that the extracted command data does not correspond to any known command at the cradle 104, the cradle 104 returns to block 505.

When the determination at block 555 is affirmative, however, the cradle 104 proceeds to block 560. At block 560 the controller 454 executes the command identified in the extracted command data. The controller 454 stores indications of actions that correspond to each predefined command identifier. Thus, for example, the controller 454 stores, in connection with the unlock command identifier, an indication that the actuator 470 is to be activated via the first control switch 462, for a length of time specified by the extracted command parameter. As shown in FIG. 6, the performance of block 560 therefore includes retracting the latch 120 by closing the switch 462 to power the actuator 470, and opening the switch 462 after the timeout period of eight seconds, to cut off power to the actuator 470 and return the latch 120 to the extended position.

As noted earlier, the performance of the method 500 can be employed to control the cradle 104 from the device 116 for a plurality of actions beyond, or in addition to, unlocking the device 116. That is, the command identifiers stored in the repository 600 can correspond to various other actions for execution at block 560, and to various combinations of actions. For example, another command identifier corresponds to the activation of the light 474 (by closing the second control switch 466). Further, different command identifiers can correspond to different colors and/or patterns of activation (e.g. flashing) for the light 474. For example, a given command identifier can be selected to cause the cradle 104 to flash the light 474 with a specific color (e.g. red) to indicate an error, such as the error signal resulting from a negative determination at block 515. Various other command parameters can also be employed to specify color or activation pattern. Still further command identifiers correspond to combinations of actions, such as a combination of retracting the latch 120 and activating the light 474 (e.g. to indicate to an operator which slot 112 is being unlocked).

In the embodiments set out above, commands are generated at the mobile device 116 and transmitted to the cradle 104 via the generation of a current profile at the charging contacts 200. In other words, for unlocking the device 116 from the cradle 104, the device 116 detects the unlock event at block 510 and evaluates the unlock condition at block 515 before generating the command sequence and toggling the signaling switch 424 to instruct the cradle 104. In other embodiments, however, at least some of the above processing is performed by the cradle 104 (e.g. the controller 454) rather than the device 116. For example, in some embodiments the cradle 104 detects the unlock event as described above in connection with block 510. That is, the cradle 104 performs block 510 rather than the device 116. The cradle 104 can detect the unlock event via similar mechanisms to those discussed above, such as via the receipt of a signal from a kiosk or other computing device, or the presentation of a physical token at the cradle 104. In such embodiments, the cradle 104 includes a communications interface permitting the detection of such events.

Having detected the unlock event, the cradle 104 may transmit a request to the device 116 to evaluate the unlock condition (e.g. whether the battery 416 has sufficient capacity) at block 515. The cradle 104 can transmit the request according to a mechanism similar to that described above. In particular, the cradle 104 can be provided with a switch to enable and disable delivery of power via the power connectors 300, and the device 116 can be equipped with a current sensor (e.g. in the power supply 412). The cradle 104 can therefore toggle the above-mentioned switch according to a command sequence to generate a current profile detectable by the device 116. That is, the cradle 104 performs blocks 525-535 to transmit the request, while the device 116 performs blocks 540-550 to detect the request. The device 116 can then evaluate the unlock condition by performing block 515, and when the unlock condition is satisfied, the device 116 transmits a response to the cradle 104 as described above in connection with blocks 525-535, causing the cradle 104 to unlock the device 116.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A mobile computing device, comprising:
a housing having a recess configured to receive a latch of a charging cradle to lock the mobile computing device in the charging cradle;
a set of charging contacts configured to engage with corresponding power connectors of the charging cradle; and
a processor configured to:
responsive to detecting an unlock event, determine whether an unlock condition is satisfied; and
when the unlock condition is satisfied, cause the charging cradle to release the latch by: generating a current profile at the set of charging contacts, the current profile corresponding to an unlock command, and causing the charging cradle to release the latch responsive to extracting the unlock command from the current profile.

2. The mobile computing device of claim 1, further comprising:
a power supply subsystem connected with a battery, wherein the set of charging contacts is connected to the power supply subsystem; and
a signaling switch connected between the charging contacts.

3. The mobile computing device of claim 2, wherein when the unlock condition is satisfied, the processor is further configured to toggle the signaling switch according to the unlock command a command.

4. The mobile computing device of claim 3, wherein when the unlock condition is satisfied, the processor is further configured to disconnect the power supply subsystem from the charging contacts.

5. The mobile computing device of claim 4, wherein the processor is further configured to disconnect the power supply subsystem from the charging contacts by opening a switch connected between the charging contacts and the power supply subsystem.

6. The mobile computing device of claim 3, wherein the mobile computing device further comprises a memory storing a plurality of command identifiers; and
wherein the processor is further configured, when the unlock condition is satisfied, to select an active one of the command identifiers and to generate the unlock command according to the active command identifier.

7. The mobile computing device of claim 6, wherein the processor is further configured, in order to generate the unlock command, to binary-encode the active command identifier.

8. The mobile computing device of claim 7, wherein the processor is further configured, in order to generate the unlock command, to binary-encode the active command identifier and a command parameter.

9. The mobile computing device of claim 8, wherein the command parameter indicates a timeout period for the unlock command.

10. The mobile computing device of claim 7, wherein the processor is further configured, in order to toggle the signaling switch according to the unlock command, to:
activate the signaling switch for a first predetermined time period for a first binary value; and
activate the signaling switch for a second predetermined time period for a second binary value.

11. The mobile computing device of claim 3, wherein the processor is configured to toggle the signaling switch according to the unlock command to generate the current profile across the charging contacts, to cause the charging cradle to (i) release the latch and (ii) activate an indicator output responsive to detection of the current profile at the power connectors.

12. A method in a mobile computing device, comprising:
receiving electrical power from a charging cradle via a set of charging contacts configured to engage with corresponding power connectors of the charging cradle, wherein the charging cradle includes a latch received in a recess of a housing of the mobile computing device to lock the mobile computing device in the charging cradle;
responsive to detecting an unlock event, determining whether an unlock condition is satisfied; and
when the unlock condition is satisfied, causing the charging cradle to release the latch by: generating a current profile at the set of charging contacts, the current profile corresponding to an unlock command, and causing the charging cradle to release the latch responsive to extracting the unlock command from the current profile.

13. The method of claim 12, further comprising:
when the unlock condition is satisfied, disconnecting a power supply subsystem of the mobile computing device from the set of charging contacts.

14. The method of claim 13, further comprising:
toggling a signaling switch connected between the charging contacts according to the unlock command.

15. The method of claim 13, further comprising: disconnecting the power supply subsystem from the charging contacts by opening a switch connected between the charging contacts and the power supply subsystem.

16. The method of claim 12, further comprising:
storing a plurality of command identifiers in a memory of the mobile computing device; and
when the unlock condition is satisfied, selecting an active one of the command identifiers and generating the unlock command according to the active command identifier.

17. The method of claim 16, further comprising generating the unlock command by binary-encoding the active command identifier.

18. The method of claim 17, further comprising generating the unlock command by binary-encoding the active command identifier and a command parameter.

19. The method of claim 18, wherein the command parameter indicates a timeout period for the unlock command.

20. The method of claim 14, further comprising, to toggle the signaling switch according to the unlock command:
activating the signaling switch for a first predetermined time period for a first binary value; and
activating the signaling switch for a second predetermined time period for a second binary value.

21. A charging cradle for a mobile computing device, the charging cradle comprising:
a cradle body defining a slot to receive the mobile computing device;
a set of power connectors in the slot configured to engage with corresponding charging contacts on a housing of the mobile computing device;
a latch movable between (i) an extended position to engage with the housing and lock the mobile computing device into the slot, and (ii) a retracted position to disengage from the housing to unlock the mobile computing device for removal from the slot;
a current sensor coupled to the power connectors; and
a controller connected to the current sensor and the latch, wherein the controller is configured to:
receive a measured current profile from the current sensor;
extract command data from the measured current profile;
responsive to extracting the command data, move the latch from the extended position to the retracted position to unlock the mobile computing device.

22. The charging cradle of claim 21, wherein the controller is further configured, prior to receiving the measured current profile, to monitor the power connectors for a current draw below a predetermined threshold.

23. The charging cradle of claim 21, further comprising:
an actuator coupled to the latch;
wherein the controller is configured, in order to move the latch, to supply power to the actuator.

24. The charging cradle of claim 21, wherein the extracted command data includes an extracted command identifier and an extracted command parameter.

25. The charging cradle of claim 24, wherein the predefined command data includes at least a predefined unlock command identifier; and wherein the controller is further configured to:
when the extracted command identifier matches the unlock command identifier, return the latch to the extended position after a timeout period defined by the extracted command parameter.

* * * * *